(12) United States Patent  
Li

(10) Patent No.: US 12,175,370 B2
(45) Date of Patent: Dec. 24, 2024

(54) ARTIFICIAL NEURAL NETWORK

(71) Applicant: Nokia Technologies Oy, Espoo (FI)

(72) Inventor: Hongyang Li, Tianjin (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/300,654

(22) Filed: Apr. 14, 2023

(65) Prior Publication Data

US 2023/0259782 A1    Aug. 17, 2023

Related U.S. Application Data

(63) Continuation of application No. 16/617,848, filed as application No. PCT/CN2017/086972 on Jun. 2, 2017, now Pat. No. 11,651,230.

(51) Int. Cl.
*G06N 3/084* (2023.01)
*G06N 3/088* (2023.01)
(Continued)

(52) U.S. Cl.
CPC .............. *G06N 3/084* (2013.01); *G06N 3/088* (2013.01); *G06V 10/764* (2022.01);
(Continued)

(58) Field of Classification Search
CPC ........ G06N 3/084; G06N 3/088; G06N 3/045; G06N 3/048; G06N 3/04; G06N 3/02;
(Continued)

(56) References Cited

U.S. PATENT DOCUMENTS 9,646,243 B1    5/2017  Gokmen
11,651,230 B2 *  5/2023  Li ........................... G06N 3/088
                                                                726/25
(Continued)

FOREIGN PATENT DOCUMENTS

CN        106203283 A    12/2016
CN        106355244 A     1/2017
(Continued)

OTHER PUBLICATIONS

Nair et al., "Rectified Linear Units Improve Restricted Boltzmann Machines", ICML'10 Proceedings of the 27th International Conference on International Conference on Machine Learning, Jun. 21-24, 2010, 8 pages.
(Continued)

*Primary Examiner* — Yogeshkumar Patel
(74) *Attorney, Agent, or Firm* — ALSTON & BIRD LLP

(57) ABSTRACT

According to an example aspect of the present invention, there is provided an apparatus comprising memory configured to store convolutional artificial neural network information comprising at least one filter definition, and at least one processing core configured to generate, from a preceding layer, a convolutional result of a succeeding layer of the artificial neural network in accordance with the at least one filter definition, and generate, from the convolutional result, an activation result of the succeeding layer by using an activation function, the activation function taking three arguments, the three arguments being derived from the convolutional result.

16 Claims, 5 Drawing Sheets

(51) Int. Cl.
G06V 10/764 (2022.01)
G06V 10/82 (2022.01)
G06V 20/56 (2022.01)
G06V 20/64 (2022.01)
G06V 40/10 (2022.01)

(52) U.S. Cl.
CPC ............ G06V 10/765 (2022.01); G06V 10/82 (2022.01); G06V 20/56 (2022.01); G06V 20/64 (2022.01); G06V 40/103 (2022.01)

(58) Field of Classification Search
CPC .... G06V 10/764; G06V 10/765; G06V 10/82; G06V 20/56; G06V 20/64; G06V 40/103; G06V 20/35; G06V 10/454; G06V 10/255; G08G 1/166
See application file for complete search history.

(56) References Cited

U.S. PATENT DOCUMENTS

| | | |
|---|---|---|
| 2016/0155049 A1 | 6/2016 | Choi |
| 2016/0239706 A1 | 8/2016 | Dijkman et al. |
| 2016/0321542 A1 | 11/2016 | Towal |
| 2017/0011281 A1* | 1/2017 | Dijkman ............. G06V 10/768 |
| 2017/0132496 A1 | 5/2017 | Shoaib et al. |
| 2018/0018553 A1* | 1/2018 | Bach ..................... G10L 25/30 |

FOREIGN PATENT DOCUMENTS

| | | |
|---|---|---|
| CN | 106599797 A | 4/2017 |
| CN | 106778701 A | 5/2017 |
| KR | 1020170023708 A | 3/2017 |
| WO | 2016/182674 A | 11/2016 |
| WO | 2017/015887 A1 | 2/2017 |
| WO | 2018/120082 A1 | 7/2018 |
| WO | 2018/152741 A1 | 8/2018 |

OTHER PUBLICATIONS

Glorot et al., "Deep Sparse Rectifier Neural Networks", Proceedings of the Fourteenth International Conference on Artificial Intelligence and Statistics, 2011, pp. 315-323.
He et al., "Delving Deep into Rectifiers: Surpassing Human-Level Performance on ImageNet Classification", arXiv, Feb. 2015, pp. 1026-1034.
Xu et al., "Empirical Evaluation of Rectified Activations in Convolutional Network", arXiv, Nov. 27, 2015, 5 pages.
Goodfellow et al., "Maxout Networks", arXiv, Sep. 20, 2013, 9 pages.
Clevert et al., "Fast and Accurate Deep Network Learning by Exponential Linear Units (ELUs)", arXiv, Feb. 22, 2016, pp. 1-14.
Shang et al., "Understanding and Improving Convolutional Neural Networks via Concatenated Rectified Linear Units" arXiv, Jul. 19, 2016, 17 pages.
Maas et al., "Rectifier Nonlinearities Improve Neural Network Acoustic Models", Proc. Icml, vol. 30, Issue 1, 2013, 6 pages.
Li et al., "Improving Deep Neural Network with Multiple Parametric Exponential Linear Units", arXiv, Jun. 1, 2016, pp. 1-16.
Lin et al., "Network In Network", arXiv, Dec. 16, 2013, pp. 1-9.
Simonyan et al., "Very Deep Convolutional Networks for Large-Scale Image Recognition", arXiv, Sep. 4, 2014, pp. 1-10.
Dushkoff et al., "Adaptive Activation Functions for Deep Networks", Electronic Imaging, Computational Imaging XIV, Nov. 30, 2016, 5 pages.
Buchholz, "A Theory of Neural Computation with Clifford Algebras", Dissertation, Mar. 16, 2005, 145 pages.
"A Visual Proof That Neural Nets Can Compute Any Function", Retrieved on Nov. 26, 2019, Webpage available at : http://neuralnetworksanddeeplearning.com/chap4.html.
Harmon et al., "Activation Ensembles for Deep Neural Networks", arXiv, Feb. 24, 2017, 9 pages.
Cai et al., "Deep Neural Networks with Multistate Activation Functions", Computational Intelligence and Neuroscience, vol. 2015, Article ID 721367, Aug. 23, 2015, pp. 1-10.
Szarvas et al., "Pedestrian Detection with Convolutional Neural Networks", IEEE Proceedings. Intelligent Vehicles Symposium, Jun. 6-8, 2005, 6 pages.
International Search Report and Written Opinion received for corresponding Patent Cooperation Treaty Application No. PCT/CN2017/086972, dated Feb. 24, 2018, 9 pages.
Extended European Search Report received for corresponding European Patent Application No. 17912152.0, dated Jan. 14, 2021, 7 pages.
Wu et al., "A Light CNN for Deep Face Representation with Noisy Labels", arXiv, Apr. 24, 2017, 13 pages.
Cosma et al., "Pedestrians Detection Using a Cascade of LBP and HOG classifiers", IEEE 9th International Conference on Intelligent Computer Communication and Processing (ICCP), Sep. 5-7, 2013, pp. 69-75.
Nguyen et al., "Person Recognition System Based on a Combination of Body Images from Visible Light and Thermal Cameras", Sensors, vol. 17, No. 3, 2017, pp. 1-29.
Notice of Allowance received for corresponding U.S. Appl. No. 16/617,848, dated Aug. 24, 2022, 9 pages.
Notice of Allowance received for corresponding U.S. Appl. No. 16/617,848, dated Jan. 19, 2023, 9 pages.
Office action received for corresponding Chinese Patent Application No. 201780093015.9, dated Mar. 17, 2023, 9 pages of office action and no page of translation available.
Office Action for Chinese Application No. 201780093015.9 dated Dec. 1, 2023, 19 pages.
Office Action for European Application No. 17912152.0 dated Oct. 4, 2023, 9 pages.
Office Action for Chinese Application No. 2017800930105.9 dated Mar. 30, 2024, 8 pages.
Office Action for European Application No. 17912152.0 dated Apr. 2, 2024, 5 pages.

* cited by examiner

ARTIFICIAL NEURAL NETWORK

This is a continuation patent application of U.S. patent application Ser. No. 16/617,848, filed Nov. 27, 2019, entitled "ARTIFICIAL NEURAL NETWORK" which is a national stage entry of International Application No. PCT/CN2017/086972, filed Jun. 2, 2017, both of which are hereby incorporated by reference in their entireties.

FIELD

The present invention relates to artificial neural networks, such as, for example, convolutional artificial neural networks.

BACKGROUND

Machine learning and machine recognition finds several applications, such as, for example, automated passport control at airports, where a digital image of a person's face may be compared to biometric information, stored in a passport, characterizing the person's face.

Another example of machine recognition is in handwriting or printed document text recognition, to render contents of books searchable, for example. A yet further example is pedestrian recognition, wherein, ultimately, a self-driving car is thereby seen as being enabled to become aware a pedestrian is ahead and the car can avoid running over the pedestrian.

In addition to visual recognition, spoken language may be the subject of machine recognition. When spoken language is recognized, it may be subsequently input to a parser to provide commands to a digital personal assistant, or it may be provided to a machine translation program to thereby obtain a text in another language, corresponding in meaning to the spoken language.

Machine recognition technologies employ algorithms engineered for this purpose. For example, artificial neural networks may be used to implement machine vision applications. Artificial neural networks may be referred to herein simply as neural networks. Machine recognition algorithms may comprise processing functions, in recognition of images such processing functions may include, for example, filtering, such as morphological filtering, thresholding, edge detection, pattern recognition and object dimension measurement.

A neural network may comprise, for example, fully connected layers and convolutional layers. A fully connected layer may comprise a layer wherein all neurons have connections to all neurons on an adjacent layer, such as, for example, a preceding layer. A convolutional layer may comprise a layer wherein neurons receive input from a part of a preceding layer, such part being referred to as a receptive field, for example.

A convolution result may be obtained from a linear operation with a receptive field of a preceding layer and a filter, for populating neurons of a succeeding layer with values.

SUMMARY OF THE INVENTION

The invention is defined by the features of the independent claims. Some specific embodiments are defined in the dependent claims.

According to a first aspect of the present invention, there is provided an apparatus comprising memory configured to store convolutional artificial neural network information comprising at least one filter definition, and at least one processing core configured to generate, from a preceding layer, a convolutional result of a succeeding layer of the artificial neural network in accordance with the at least one filter definition, and generate, from the convolutional result, an activation result of the succeeding layer by using an activation function, the activation function taking three arguments, the three arguments being derived from the convolutional result.

Various embodiments of the first aspect may comprise at least one feature from the following bulleted list:
- one of the activation function arguments is a first convolutional result value, and the at least one processing core is configured to derive the other two of the activation function arguments from a neighbourhood of the first convolutional result value
- the neighbourhood of the first convolutional result value comprises eight other convolutional result values
- the other two of the activation function arguments comprise a value indicating a horizontal variation and a value indicating vertical variation
- the activation function produces, from the three arguments, two outputs
- the two outputs comprise an output relating to horizontal variation
- the two outputs comprise an output relating to vertical variation
- the last layer of the artificial neural network comprises a result layer
- the artificial neural network is configured to detect pedestrians
- the artificial neural network is configured to use an input data item which comprises an image.

According to a second aspect of the present invention, there is provided a method comprising storing convolutional artificial neural network information comprising at least one filter definition generating, from a preceding layer, a convolutional result of a succeeding layer of the artificial neural network in accordance with the at least one filter definition, and generating, from the convolutional result, an activation result of the succeeding layer by using an activation function, the activation function taking three arguments, the three arguments being derived from the convolutional result.

Various embodiments of the second aspect may comprise at least one feature from the following bulleted list:
- one of the activation function arguments is a first convolutional result value, and the other two of the activation function arguments are derived from a neighbourhood of the first convolutional result value
- the neighbourhood of the first convolutional result value comprises eight other convolutional result values
- the other two of the activation function arguments comprise a value indicating a horizontal variation and a value indicating vertical variation
- the activation function produces, from the three arguments, two outputs
- the two outputs comprise an output relating to horizontal variation
- the two outputs comprise an output relating to vertical variation
- the last layer of the artificial neural network comprises a result layer
- the artificial neural network is configured to detect pedestrians
- the artificial neural network is configured to use an input data item which comprises an image According to a third aspect of the present invention, there is provided an apparatus comprising means for storing convolutional artificial neural network information comprising at least one filter definition, means for generating, from a preceding layer, a convolutional result of a succeeding layer of the artificial neural network in accordance with the at least one filter definition, and means for generating, from the convolutional result, an activation result of the succeeding layer by using an activation function, the activation function taking three arguments, the three arguments being derived from the convolutional result.

According to a fourth aspect of the present invention, there is provided a non-transitory computer readable medium having stored thereon a set of computer readable instructions that, when executed by at least one processor, cause an apparatus to at least store convolutional artificial neural network information comprising at least one filter definition, generate, from a preceding layer, a convolutional result of a succeeding layer of the artificial neural network in accordance with the at least one filter definition, and generate, from the convolutional result, an activation result of the succeeding layer by using an activation function, the activation function taking three arguments, the three arguments being derived from the convolutional result.

According to a fifth aspect of the present invention, there is provided a computer program configured to cause a method in accordance with the second aspect to be performed.

EMBODIMENTS

An activation function may be used in populating a layer of an artificial neural network, such that an activation function takes an input of a convolutional result from a preceding layer, obtained using filter coefficients, and produces an activation result as an output, the activation result being then entered, or populated, into neurons of the layer. A three-dimensional activation function is herein described, such that the activation result reflects a more nuanced rendering of features of the convolutional result. For example, the three-dimensional activation function may take as inputs a base element from the convolutional result, and values characterizing gradients in two directions in the neighbourhood of the base element. This may enable a higher selectivity for, for example, vertically oriented objects such as pedestrians.

Figure 1:
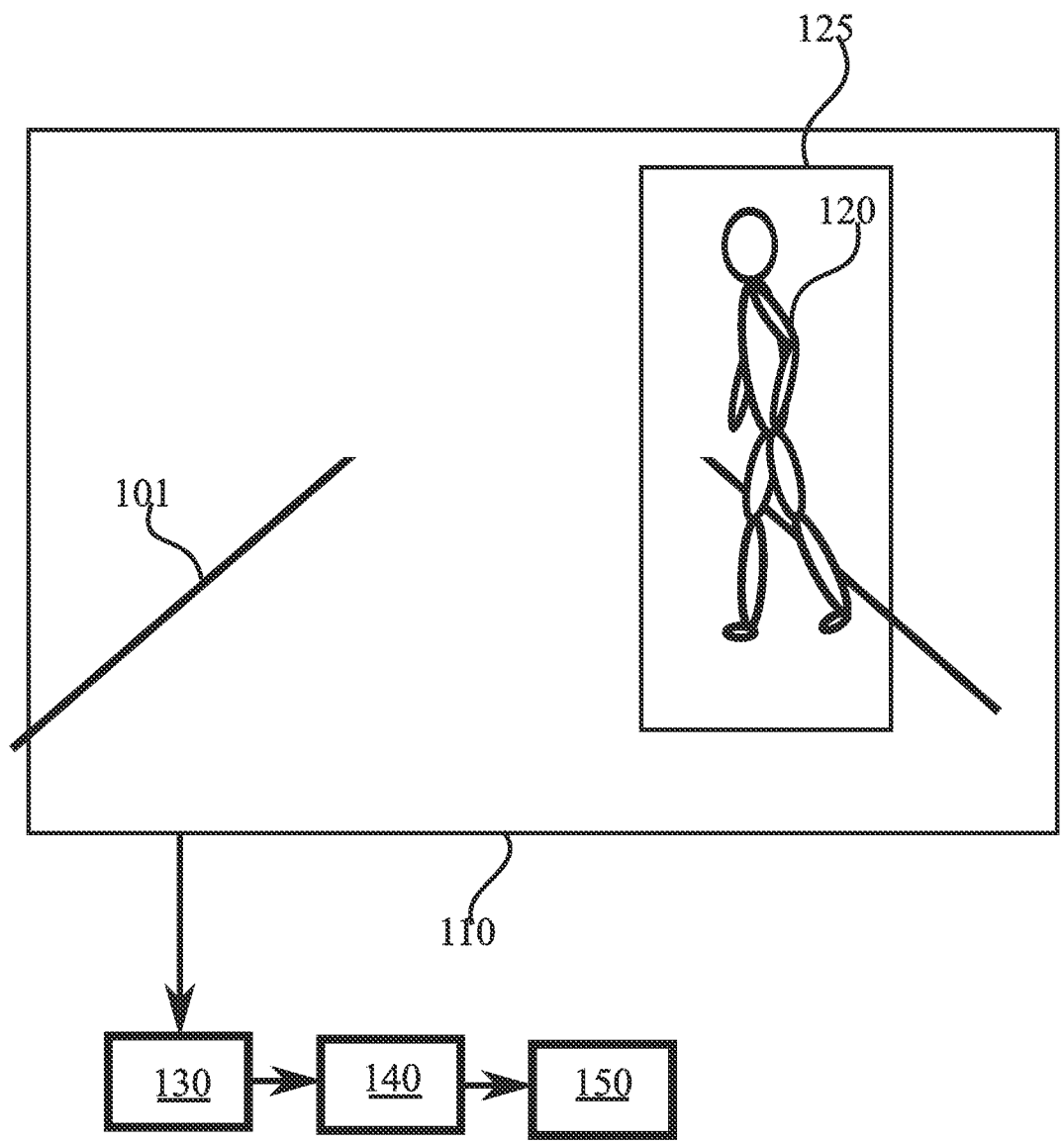
FIG. 1 illustrates an example system capable of supporting at least some embodiments of the present invention.

FIG. 1 illustrates an example system capable of supporting at least some embodiments of the present invention. FIG. 1 has a view 110 of a road 101, on which a pedestrian 120 is walking. While described herein in connection with FIG. 1 in terms of detecting pedestrians, the invention is not restricted thereto, but as the skilled person will understand, the invention is applicable also more generally to machine recognition in visual, audio or other kind of data, or indeed more generally to operating artificial neural networks. For example, bicyclist recognition, handwriting recognition, facial recognition, traffic sign recognition, voice recognition, language recognition, sign language recognition and/or spam email recognition may benefit from the present invention, depending on the embodiment in question.

In FIG. 1, road 101 is imaged by a camera. The camera may be configured to capture a view 110 that covers the road, at least in part. The camera may be configured to pre-process image data obtained from an image capture device, such as a charge-coupled device, CCD, comprised in the camera. Examples of pre-processing include reduction to black and white, contrast adjustment and/or brightness balancing to increase a dynamic range present in the captured image. In some embodiments, the image data is also scaled to a bit depth suitable for feeding into an image recognition algorithm, such as AdaBoost, for example. Pre-processing may include selection of an area of interest, such as area 125, for example, for feeding into the image recognition algorithm. Pre-processing may be absent or limited in nature, depending on the embodiment. The camera may be installed, for example, in a car that is configured to drive itself, or collect training data. Alternatively, the camera may be installed in a car designed to be driven by a human driver, but to provide a warning and/or automatic braking if the car appears to be about to hit a pedestrian or an animal.

An image feed from the camera may be used to generate a test dataset for use in training a neural network. Such a dataset may comprise training samples. A training sample may comprise a still image, such as a video image frame, or a short video clip, for example. Where the incoming data to be recognized is not visual data, the incoming data may comprise, for example, a vector of digital samples obtained from an analogue-to-digital converter. The analogue-to-digital converter may obtain an analogue feed from a microphone, for example, and generate the samples from the analogue feed. Overall, as discussed above, data of non-visual forms may also be the object of machine recognition. For example, accelerometer or rotation sensor data may be used to detect whether a person is walking, running or falling. As a neural network may be trained to recognize objects in view 110, a training phase may precede a use phase, or test phase, of the neural network.

The neural network is illustrated schematically in FIG. 1 as first layer 130, second layer 140 and third layer 150. An actual network may comprise more than three layers. When populating neurons of third layer 150, for example, a convolutional filter may be applied to data in second layer 140. For example, a convolutional filter may have sixteen coefficients, corresponding to a 4×4 grid. Applying the convolutional filter to the preceding layer, that is, second layer 140, yields a convolutional result. In the convolutional result, each element corresponds to a result of a linear operation between the filter coefficients and a receptive field in second layer 140. In general, third layer 150 succeeds second layer 140, and second layer 140 precedes third layer 150.

The convolutional result may have dimensions matching those of third layer 150, or, more generally, the succeeding layer. Where the dimensions to not match, they may be made to match, for example by cropping. Zero-padding of the preceding layer may also be used, in some embodiments, to facilitate the convolutional linear operations. In principle, the convolutional result may be stored directly in the succeeding layer. However, using an activation function may provide improved results in operation. A simple activation function is a linear rectifier f, which produces an activation result f(x) from an element in the convolutional result x as f(x)=max(0, x). This simply limits the values to be populated into the succeeding layer to zero and above, such that any negative values in the convolutional result are mapped to zeroes.

In at least some embodiments of the invention, the used activation function takes three arguments. The arguments may be derived from the convolutional result, for example so that at least one of the arguments is an element comprised in the convolutional result. Such an element may comprise a result value of the convolutional result. Further, at least one of the arguments may be derived using a mathematical process from elements of the convolutional result.

By taking three arguments it is herein meant the activation function is three-dimensional in the sense that a domain of the activation function is a three dimensional space. Equivalently, this may be expressed as the activation function being a real multivariate function. The activation function may take the three arguments each invocation. The activation function may take the type r(x,y,z)=a, with a denoting the activation result. The activation result may be one-dimensional or two-dimensional, for example. An example of a two-dimensional activation result is r(x,y,z)=[$g_h$(x,y), $g_v$(x,z)] where the subscript h denotes horizontal and the subscript v denotes vertical. Where the activation result is two-dimensional, the activation function has a range that is a two-dimensional space.

For example, in an application geared at detecting pedestrians, enabling in the activation function a sensitivity to vertical aspects of the convolutional result may enhance detection of pedestrians, since pedestrians have a vertical character owing to the way humans walk in an upright position, as illustrated in FIG. 1. An example of sensitivity to a vertical aspect in this regard is that one of the arguments of the activation function is a local vertically oriented gradient in the convolutional result. Likewise, a horizontal sensitivity may be obtained by determining a local horizontally oriented gradient in the convolutional result. One example of three arguments to be provided to the activation function is thus an element comprised in the convolutional result, and local vertical and horizontal gradients in the convolutional result.

Another example of an activation function taking three arguments is one where a first one of the three arguments is an element comprised in the convolutional result, and the other two arguments characterize frequency aspects in the convolutional result in the neighbourhood of the element that is the first one of the arguments. Such localized frequency aspects may be obtained using wavelets, for example. Such localized frequency aspects may comprise indications as to the presence or absence of certain frequencies, for example. Such localized frequency aspects may be oriented in the horizontal and vertical direction, respectively, for example.

In general, where the activation function takes three arguments, one of the arguments may be an element comprised in the convolutional result, a second one of the arguments may characterize a horizontal property of the convolutional result in the neighbourhood of the first argument, and a third one of the arguments may characterize a vertical property of the convolutional result in the neighbourhood of the first argument. Gradients and frequency characteristics are examples of properties the second and third arguments may characterize.

Figure 2:
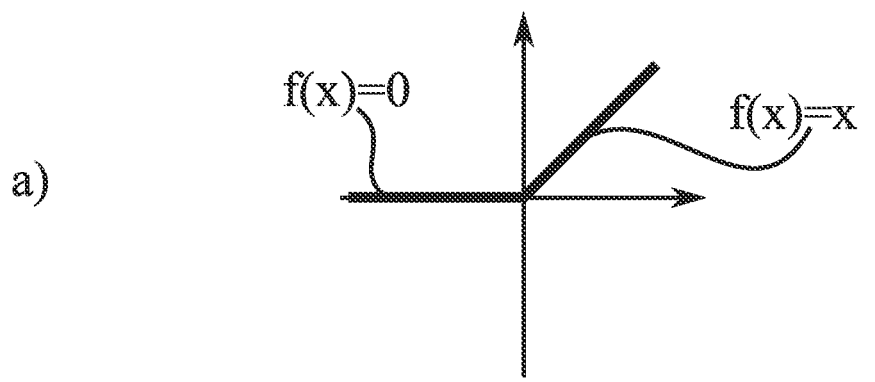
FIG. 2 illustrates aspects relating to activation functions.
Figure 2:
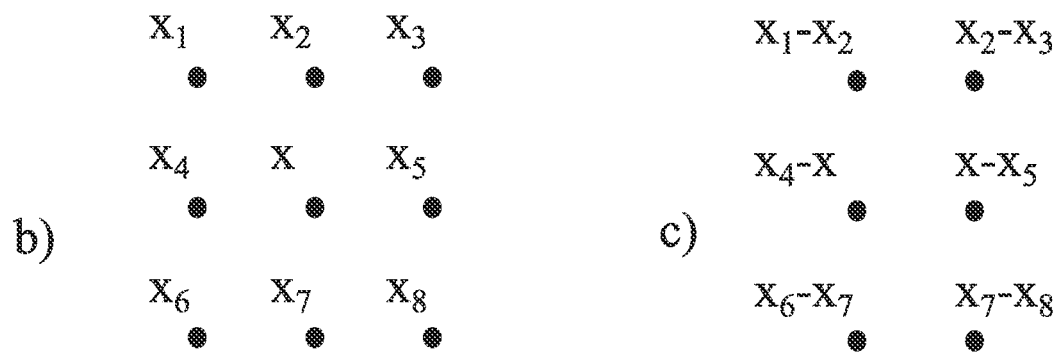

FIG. 2 illustrates aspects relating to activation functions. In part a) of the FIGURE, a simple one-argument activation function is illustrated, which is a rectifier of the type f(x)=max(0, x), as discussed above. Another example of an activation function is a sigmoid function:

$$\text{sigmoid}(x) = \frac{1}{1+e^{-x}}.$$

In part b) of FIG. 2, a part of a convolutional result is illustrated, in the neighbourhood of element x. Thus each element here corresponds to a result of a linear operation between a filter and a respective receptive field in a preceding layer. Part c) of FIG. 2 illustrates a horizontal gradient field of the convolutional result neighbourhood of part b). Each element of the gradient field of part c) of the FIGURE is calculated as a difference between an element in part b) and a horizontal neighbour thereof. For example, the top left element of part c) is a difference between elements $x_1$ and $x_2$ of part b).

A horizontal variation of in the neighbourhood of x may be expressed as:

$$y=(x_1-x_2)^2+(x_2-x_3)^2+(x_4-x)^2+(x-x_5)^2+(x_6-x_7)^2+(x_7-x_8)^2$$

in other words, the variation may be expressed as a sum of squares of horizontally aligned differences. Likewise, a vertical variation may be expressed as:

$$z=(x_1-x_4)^2+(x_2-x)^2+(x_3-x_5)^2+(x_4-x_6)^2+(x-x_7)^2+(x_5-x_8)^2$$

Using these in an activation function which takes three arguments may take the form $$r(x,y,z)=[g_h(x,y),g_v(x,z)]=[f(x+y),f(x+z)],$$

where f may be a rectifier of the type illustrated in FIG. 2 a), or f may alternatively be a sigmoid function as defined above, or indeed another kind of rectifier. Expressed in other terms, deriving the arguments for the activation function may comprise initially determining the neighbours of element x in the convolutional result, deriving gradients and obtaining variations as sums-of-squares of the gradients. In another embodiment, absolute values may be used instead of squares in obtaining the variation from the gradients. Deriving one of the arguments may simply comprise taking an element from the convolutional result, such as x in FIG. 2b).

The proposed three-dimensional activation function r(x, y,z) can be used in various deep learning algorithm architectures. For example, a traditional activation function may be replaced with the proposed activation function taking three arguments, and then the network may be trained with a standard back-propagation algorithm, for example.

ADAS, or Advanced Driver Assistance Systems/Autonomous Vehicle is taken as an example to illustrate how the described method may be used in real applications. A vision system may be equipped with the described method in an ADAS system or in an autonomous vehicle. The described method may be integrated into the vision system of such a system. In the vision system, an image may be captured by a camera and important objects such as pedestrians and bicycles may be detected from the image by a trained deep convolutional neural network, CNN, where the proposed collaborative activation function is employed. In ADAS, some indication, such as a warning voice, may be generated if important objects, such as pedestrians, are detected so that the attention of the driver of the vehicle is directed to the objects and he may take steps to avoid a traffic accident. In an autonomous vehicle, the detected objects may be used as inputs of a control module, the control module being configured to take proper action as a response to the objects. Both kinds of system may be based on detecting objects in an image.

To accomplish object detection, the described method may comprise a training stage and a testing stage. The aim of the training stage is to design the architecture of a deep CNN and learn the parameters of the deep CNN. With the designed structure and learned parameters, the testing stage may be used to classify a batch of unknown images, which are also known as testing images, as either object images or background images.

First, the training stage is described. In a data preparation step a set of training images and their labels are prepared. A label indicates that an image is either an object image or a background image.

In an architecture design step a design for the CNN is established. For example, let the deep CNN consist of S convolutional layers. The number of feature maps in layer i is $N_i$ and the number of feature maps in layer i−1 is $N_{i-1}$.

In a convolution step a convolutional filter $W_i$ of size $w_i \times h_i \times N_i$ is used to obtain the convolutional result of layer i. Here w denotes a width and h a height of a feature map.

In an activation step neighbours for convolutional result x of convolutional layer i are determined. Then, horizontal gradients of the neighbours are obtained and horizontal variation of the neighbours of x is calculated by summing the squared horizontal gradients, for example. Vertical gradients of the neighbours are obtained and vertical variation of the neighbours of x is calculated by summing the squared vertical gradients, as described above. Finally, the activation result is calculated based on the three-dimensional activation function $$r(x,y,z)=[g_h(x,y),g_v(x,z)]=[f(x+y),f(x+z)].$$

In an optional pooling step a pooling operation may be applied on one or more convolutional layers.

In an optimization step the parameters of the convolutional filters are obtained by minimizing a mean squared error of the training set, for example. The standard back-propagation algorithm may be used for solving the minimization problem. In the back-propagation algorithm, the gradients of the mean squared error with respect to the parameters of the filters are computed and back-propagated. The back-propagation may be conducted in several epochs until convergence. In general, there are many ways to optimize the filter parameters, as the skilled person knows, and the described method is not restricted to any specific one. The optimization may be an iterative procedure.

Now, the testing stage is described. With the architecture and filter parameters obtained in the training stage, the CNN can be used in classifying images, or parts thereof. First, from the first layer to the last layer, the convolutional result is computed and the activation result obtained by using the described three-dimensional activation function. If a pooling operation is needed to be applied on a convolutional layer, then a pooling operation such as max-pooling may be applied to the layer. Then, the result of the last layer is taken as a detection result.

Because a three-dimensional activation function can simultaneously take into account the convolutional result in question, x, the variation in vertical direction, and the variation in horizontal direction, the described method is more powerful in feature detection in deep learning. Consequently, the deep learning adopting the proposed three-dimensional activation function yields a better recognition rate.

To demonstrate the effectiveness of the described method, experimental results on the CIFAR10 dataset and the ImageNet dataset are reported. Comparison is done with the classical NIN [1] method, the VGG method [2], and their versions with different activation functions. To compare with traditional NIN, two schemes are adopted. In the first scheme, the described method adopts the same architecture as NIN and the number of parameters is the same as NIN. Because the described activation function outputs two values, in the second scheme the number of parameters is two times larger than that of NIN. Similarly, two schemes are employed for comparing with VGG. In the NIN method and VGG method, the classical rectified linear unit, ReLU, activation function or existing two-dimensional activation function [3] is employed. In the described methods, the ReLU activation function is replaced with the described three-dimensional activation function as described herein above. Table 1 gives the recognition error rates of different methods on different datasets. From Table 1, one can see that adopting the described three-dimensional activation function yields the lowest recognition error rate whenever the number of parameters is either equal to or larger than that of traditional methods.

TABLE 1

| | CIFAR10 dataset | ImageNet dataset |
|---|---|---|
| NIN [1] with the ReLU activation function | 10.41% | N/A |
| NIN [1] with the two-dimensional activation function [3] | 9.38% | N/A |
| NIN [1] with the proposed three-dimensional activation function and the same number of parameters as NIN | 7.82% | N/A |
| NIN [1] with the proposed three-dimensional activation function and the double number of parameters than NIN | 7.45% | N/A |
| VGG [2] with the ReLU activation function | 7.91% | 23.7% |
| VGG [2] with the two-dimensional activation function [3] | 6.84% | 21.4% |
| VGG [2] with the proposed three-dimensional activation function and the same number of parameters as VGG | 5.63% | 19.8% |
| VGG [2] with the proposed three-dimensional activation function and the double number of parameters than VGG | 5.23% | 19.3% |

Figure 3:
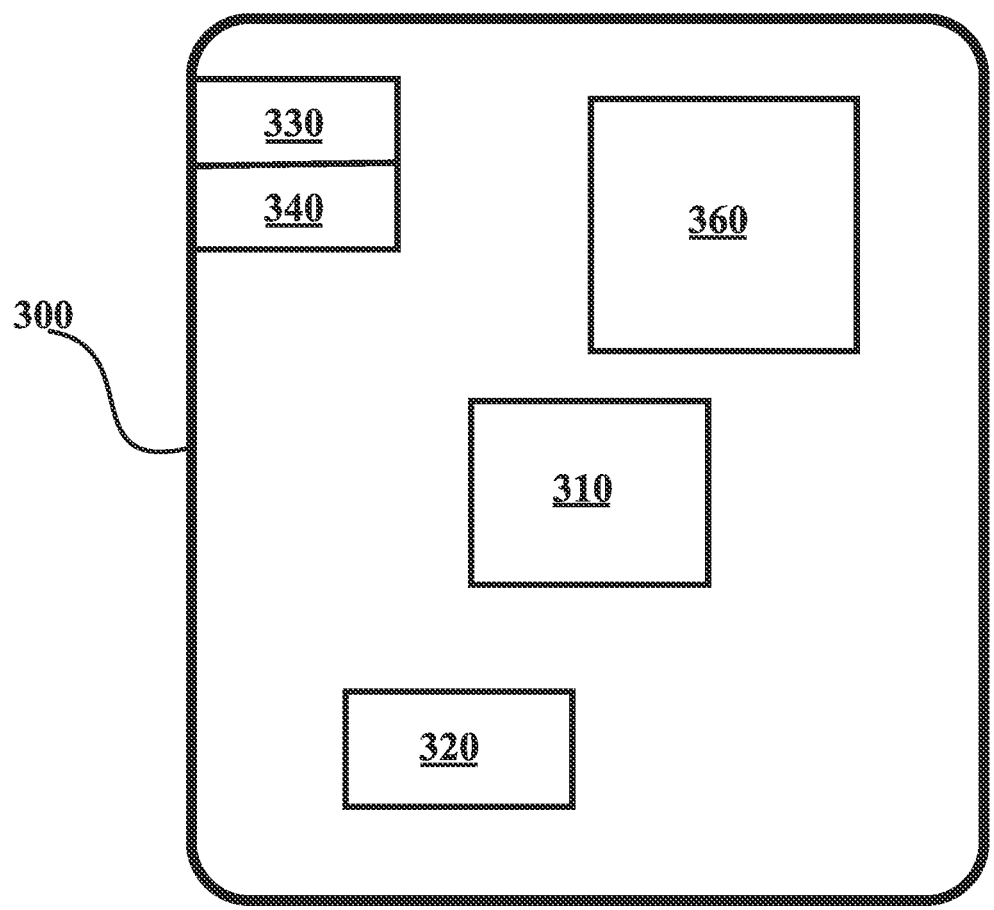
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, computing device such a server, node or cloud computing device. Device 300 may be configured to run a neural network, such as is described herein. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core by ARM Holdings or a Steamroller processing core produced by Advanced Micro Devices Corporation. Processor 310 may comprise at least one Qualcomm Snapdragon and/or Intel Core processor, for example. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Computer instructions in memory 320 may comprise a plurality of applications or processes. For example, machine learning algorithms, such as an AdaBoost algorithm with its classifiers, may run in one application or process, a camera functionality may run in another application or process, and an output of a machine learning procedure may be provided to a further application or process, which may comprise an automobile driving process, for example, to cause a braking action to be triggered responsive to recognition of a pedestrian in a camera view.

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with wireless local area network, WLAN, Ethernet, universal serial bus, USB, and/or worldwide interoperability for microwave access, WiMAX, standards, for example. Alternatively or additionally, a proprietary communication framework may be utilized.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure machine learning parameters and/or to switch device 300 on and/or off.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340, and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
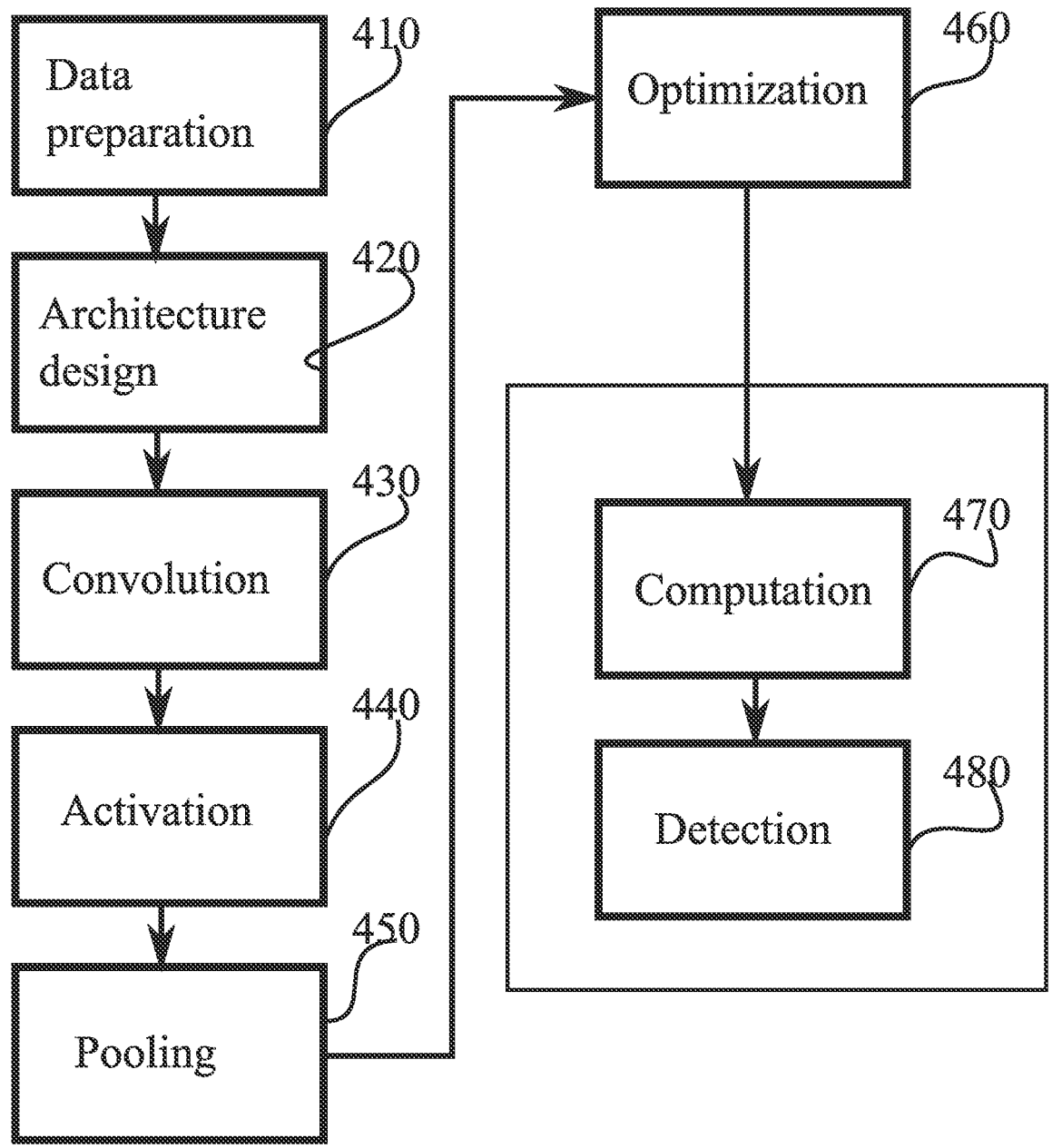
FIG. 4 is a flow graph of a method in accordance with at least some embodiments of the present invention.

FIG. 4 is a flow graph of a method in accordance with at least some embodiments of the present invention. As described above, a training phase is comprised of phases 410, 420, 430, 440, 450 and 460. A testing stage comprises phases 470 and 480.

Initially, to enable training, data is prepared for input to the neural network. This is illustrated as phase 410. An architecture of the convolutional neural network to be trained is set in phase 420. The architecture may comprise a number of layers and the number of feature maps per layer, for example. The number of feature maps need not be the same on each layer.

Using the training data, convolution, phase 430 and activation, phase 440, are performed as described above and in accordance with the selected architecture of the neural network. The pooling phase 450 is optional. Optimization, phase 460, is continued until the training data has been run through the network, using a suitable optimization algorithm to define the convolutional filter coefficients that are to be used in the testing stage. Optimization of phase 460 may comprise an iterative process, where phases 430, 440 and 450 are run repeatedly, until filter coefficients of the neural network have been optimized.

In the testing stage, data captured, for example, using a camera or video camera may be provided as input, run through the neural network using the convolutional filter coefficients obtained in the training stage, illustrated in FIG. 4 as computation phase 470, to arrive at the detection phase 480.

Figure 5:
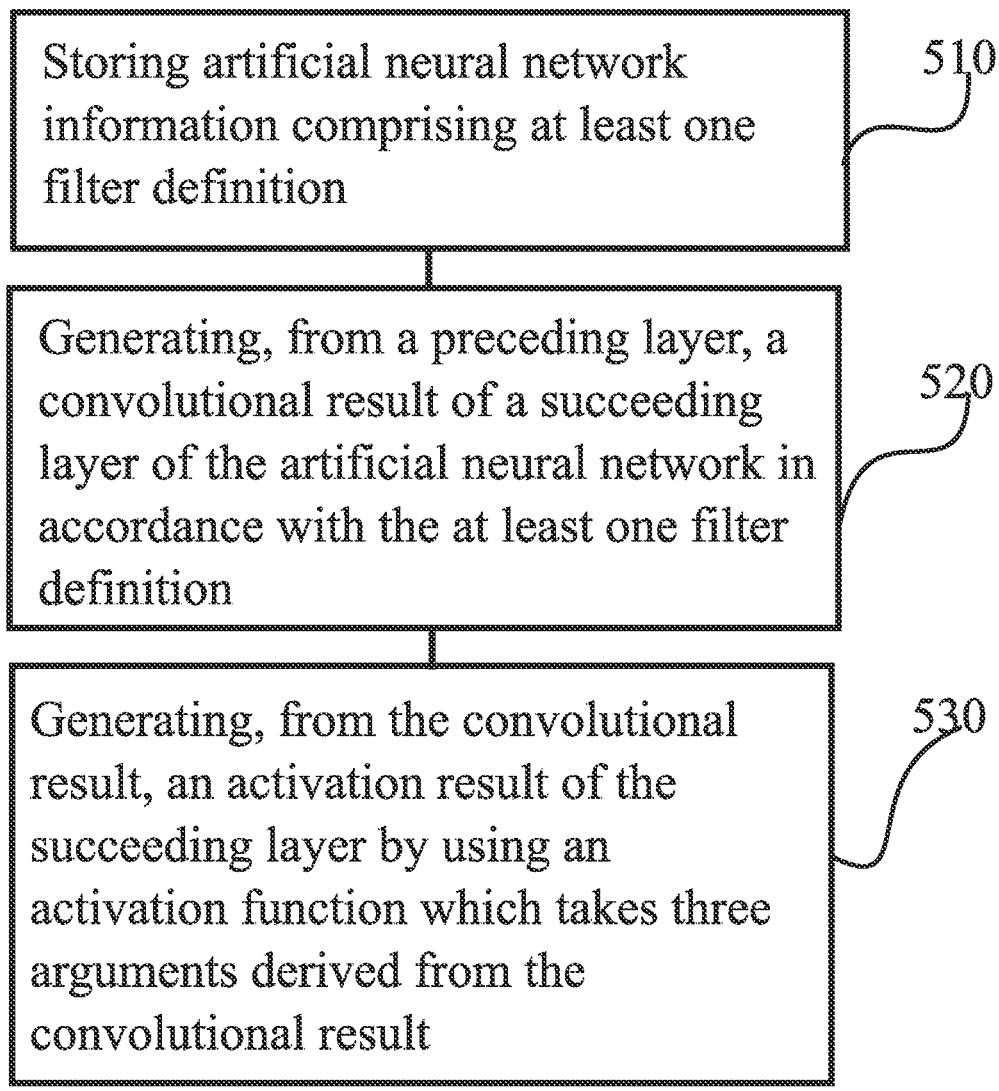
FIG. 5 is a flow graph of a method in accordance with at least some embodiments of the present invention.

FIG. 5 is a flow graph of a method in accordance with at least some embodiments of the present invention. The phases of the illustrated method may be performed in a device arranged to run the neural network, for example, by a control device of such a device.

Phase 510 comprises storing convolutional artificial neural network information comprising at least one filter definition. Phase 520 comprises generating, from a preceding layer, a convolutional result of a succeeding layer of the artificial neural network in accordance with the at least one filter definition. Finally, phase 530 comprises generating, from the convolutional result, an activation result of the succeeding layer by using an activation function, the activation function taking three arguments, the three arguments being derived from the convolutional result. Further, the succeeding layer may be populated with the activation result, or with data derived from the activation result.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optimizing machine recognition, to, for example, reduce traffic accidents in self-driving vehicles.

CITATIONS

[1] [NIN] M. Lin, Q. Chen, and S. Yan, "Network in network," CoRR, abs/1312.4400, 2013.

[2] [VGG] K. Simonyan and A. Zisserman, "Very deep convolutional networks for large-scale image recognition," CoRR, abs/1409.1556, 2014

[3] Li, H., "APPARATUS, METHOD AND COMPUTER PROGRAM PRODUCT FOR DEEP LEARNING" filed on 30 Dec. 2016 with application number PCT/CN2016/113651

ACRONYMS

ADAS Advanced driver assistance system
CNN convolutional neural network
ReLU Rectified linear unit

| REFERENCE SIGNS LIST | |
|---|---|
| 110 | View |
| 101 | Road |
| 125 | Area of interest |
| 120 | Pedestrian |
| 130 | First layer |
| 140 | Second layer |
| 150 | Third layer |
| 300-360 | Structure of device of FIG. 3 |
| 410-480 | Phases of the process of FIG. 4 |
| 510-530 | Phases of the method of FIG. 5 |

What is claimed is:

1. An apparatus comprising:
at least one processor; and
at least one memory storing instructions that, when executed by the at least one processor, to cause the apparatus at least to:
generate, from a preceding layer, a convolutional result of a succeeding layer of an artificial neural network in accordance with at least one filter definition, and
generate, from the convolutional result, an activation result of the succeeding layer by using an activation function, the activation function taking three arguments, the three arguments being derived from the convolutional result,
wherein a first argument of the activation function arguments is a first convolutional result value, wherein the first convolutional result value corresponds to a result of a linear operation between the at least one filter definition and a receptive field in the preceding layer and
wherein the instructions, when executed by the at least one processor, further cause the apparatus to derive a second argument and a third argument of the activation function arguments from at least: a neighbourhood of the first convolutional result value.

2. The apparatus according to claim 1, wherein the at least one memory and the instructions, with the at least one processor, further cause the apparatus at least to:
store convolutional artificial neural network information comprising the least one filter definition.

3. The apparatus according to claim 1, wherein:
the second argument and the third argument are derived based on the first convolutional result value and the neighbourhood of the first convolutional result value.

4. The apparatus according to claim 1, wherein the neighbourhood of the first convolutional result value comprises eight other convolutional result values.

5. The apparatus according to claim 3, wherein:
the second argument of the activation function arguments comprises a value indicating a horizontal property of the convolutional result in the neighbourhood of the first convolutional result value; and the third argument of the activation function arguments comprises a value indicating a vertical property of the convolutional result in the neighbourhood of the first convolutional result value.

6. The apparatus according to claim 5, wherein the horizontal property comprises at least one of: a gradient characteristic or a frequency characteristic.

7. The apparatus according to claim 1, wherein the artificial neural network is caused to detect one or more objects and wherein the artificial neural network is caused to use an input data item which comprises an image.

8. The apparatus according to claim 1, wherein the apparatus is a vehicle or a smartphone.

9. A method comprising:
generating, from a preceding layer, a convolutional result of a succeeding layer of an artificial neural network in accordance with at least one filter definition; and
generating, from the convolutional result, an activation result of the succeeding layer by using an activation function, the activation function taking three arguments, the three arguments being derived from the convolutional result,
wherein a first argument of the activation function arguments is a first convolutional result value, wherein the first convolutional result value corresponds to a result of a linear operation between the at least one filter definition and a receptive field in the preceding layer,
wherein a second argument and a third argument are derived from at least: a neighbourhood of the first convolutional result value.

10. The method according to claim 9, further comprising:
storing convolutional artificial neural network information comprising the at least one filter definition.

11. The apparatus according to claim 9, wherein:
the second argument and the third argument are derived based on the first convolutional result value and the neighbourhood of the first convolutional result value.

12. The method according to claim 9, wherein the neighbourhood of the first convolutional result value comprises eight other convolutional result values.

13. The method according to claim 11, wherein:
the second argument of the activation function arguments comprises a value indicating a horizontal property of the convolutional result in the neighbourhood of the first convolutional result value; and
the third argument of the activation function arguments comprises a value indicating a vertical property of the convolutional result in the neighbourhood of the first convolutional result value.

14. The method according to claim 13, wherein the horizontal property comprises at least one of: a gradient characteristic; or a frequency characteristic.

15. The method according to claim 9, wherein the artificial neural network is caused to detect one or more objects.

16. A non-transitory computer readable medium having stored thereon a set of computer readable instructions that, when executed by at least one processor, cause an apparatus to at least:
generate, from a preceding layer, a convolutional result of a succeeding layer of an artificial neural network in accordance with at least one filter definition, and
generate, from the convolutional result, an activation result of the succeeding layer by using an activation function, the activation function taking three arguments, the three arguments being derived from the convolutional result,
wherein a first argument of the activation function arguments is a first convolutional result value, wherein the first convolutional result value corresponds to a result of a linear operation between the at least one filter definition and a receptive field in the preceding layer and
wherein the instructions, when executed by the at least one processor, further cause the apparatus to derive a second argument and a third argument of the activation function arguments from at least: a neighbourhood of the first convolutional result value.

* * * * *

UNITED STATES PATENT AND TRADEMARK OFFICE
CERTIFICATE OF CORRECTION

PATENT NO. : 12,175,370 B2
APPLICATION NO. : 18/300654
DATED : December 24, 2024
INVENTOR(S) : Hongyang Li Page 1 of 1

It is certified that error appears in the above-identified patent and that said Letters Patent is hereby corrected as shown below:

In the Claims

In Column 13, Line 37, Claim 11, delete "apparatus according" and insert -- method according --, therefor.

Signed and Sealed this
Twenty-fifth Day of February, 2025

Coke Morgan Stewart
*Acting Director of the United States Patent and Trademark Office*